US006843325B2

United States Patent
Banko

(10) Patent No.: US 6,843,325 B2
(45) Date of Patent: Jan. 18, 2005

(54) OPERATOR ACTUATED ELECTRO-MECHANICAL DRAG MAT LIFT ASSEMBLY

(75) Inventor: Richard John Banko, Sebring, FL (US)

(73) Assignee: Byron J. Clay, Venice, FL (US)

( * ) Notice: Subject to any disclaimer, the term of this patent is extended or adjusted under 35 U.S.C. 154(b) by 12 days.

(21) Appl. No.: 09/957,515

(22) Filed: Sep. 21, 2001

(65) Prior Publication Data

US 2003/0056962 A1 Mar. 27, 2003

(51) Int. Cl.[7] .............................................. A01B 49/00
(52) U.S. Cl. .................................... 172/438; 172/445.1
(58) Field of Search .............................. 172/445.1, 438

(56) References Cited

U.S. PATENT DOCUMENTS

| | | | | |
|---|---|---|---|---|
| 768,358 A | * | 8/1904 | Davis | 172/612 |
| 1,061,709 A | * | 5/1913 | Ward | 172/612 |
| 1,446,419 A | * | 2/1923 | Tucker | 172/612 |
| 1,472,949 A | * | 11/1923 | Tucker | 172/612 |
| 1,530,329 A | * | 3/1925 | Glerum | 172/612 |
| 1,775,316 A | * | 9/1930 | Roberts | 172/611 |
| 1,786,194 A | * | 12/1930 | McLeod et al. | 172/612 |
| 2,718,730 A | * | 9/1955 | Dickinson | 172/612 |
| 3,126,865 A | * | 3/1964 | Brazeau | 119/234 |
| 4,374,546 A | * | 2/1983 | Mitchell | 172/148 |
| 4,505,338 A | * | 3/1985 | Koval et al. | 172/611 |
| 4,747,174 A | * | 5/1988 | Hightower | 15/78 |
| 4,836,295 A | * | 6/1989 | Estes | 172/146 |
| 5,018,587 A | * | 5/1991 | Gandrud et al. | 172/612 |
| 5,183,119 A | * | 2/1993 | Wattenburg | 171/105 |
| 5,191,944 A | * | 3/1993 | Thorn | 172/445.1 |
| 5,284,211 A | * | 2/1994 | Tozer | 172/29 |
| 5,339,732 A | * | 8/1994 | Peterlini et al. | 101/38.1 |
| 5,750,918 A | * | 5/1998 | Mangolds et al. | 102/502 |
| 5,918,684 A | * | 7/1999 | Tozer | 172/199 |
| 5,988,295 A | * | 11/1999 | Goulet | 172/810 |
| 6,151,809 A | * | 11/2000 | Altheide | 37/268 |
| 6,257,345 B1 | * | 7/2001 | Tozer | 172/199 |
| 6,454,018 B2 | * | 9/2002 | Tozer | 172/29 |
| 6,513,447 B1 | * | 2/2003 | Guzman et al. | 111/11 |

* cited by examiner

Primary Examiner—Christopher J. Novosad
(74) Attorney, Agent, or Firm—Woodard, Emhardt, Moriarty, McNett & Henry LLP

(57) ABSTRACT

An operator actuated electro-mechanical drag mat lift assembly that mounts on the rear of existing lawn equipment that provides a platform for mounting lawn care products requiring deployment for use The Banko Manufacturing International design allows the lawn equipment operator the ability to deploy the assembly while remaining seated with just the flip of a switch. Other manufacturers' designs have failed to consolidate the elements necessary into a comprehensive semi-automated concept. In addition, the innovative drag mat design, when used with the lift assembly, provides an effective method of distributing both dry and damp grass clippings improving turf appearance.

14 Claims, 6 Drawing Sheets

1

OPERATOR ACTUATED ELECTRO-MECHANICAL DRAG MAT LIFT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

As best as can be determined, no other mechanism exists that is designed to perform precisely as the Banko Manufacturing International operator actuated electromechanical drag mat lift assembly. While many other lawn care maintenance products are available, none employ the concept of incorporating multiple features into a consolidated system. In addition, an electric movement of the structure can be changed from an electric to hydraulic or mechanical system should the user so wish. The Banko Manufacturing International operator actuated electro-mechanical drag mat assembly is designed for use primarily in the lawn care maintenance industry, more specifically, the golf course sector. Though the most common type of equipment to which the assembly will be attached is anticipated to be commercial grade turf mowers, the design will allow the user, with modifications, to equip other mechanical devices, such as lawn type tractors, with the Banko Manufacturing International mat. The design of the hitch mount will vary to accommodate several manufacturers' equipment so that a range of mounting options is possible.

Past designs have failed to incorporate a significant degree of automation, a valuable feature in a labor-intensive industry where time and facility of use are important factors. A more automated system allows the operator the freedom to concentrate on other aspects of the task at hand without having to depart the comfort and relative safety of his seat in order to raise the lift and its attached implement. A manual system, using a design similar to that of the Banko Manufacturing International operator actuated model, is an anticipated option.

Another advantage of the Banko Manufacturing International design over other related manufacturer's systems is the effectiveness of the performance of the combined lift and drag mat accessory under adverse conditions. After field-testing on golf ranges, the Banko Manufacturing International device has been found to dramatically improve newly mowed range turf appearance and condition when compared to those adjacent areas not employing the device. Problems observed using other manufacturer's attachments, specifically the drag mat, demonstrated a pronounced ineffectiveness when used on damp or water-saturated turf. The Banko Manufacturing International drag mat, used in conjunction with the lift assembly, performs well under most conditions due to the unique combination of the drag materials used, which greatly reduces the turf build-up and piling observed in previous designs. In addition, the overall dimension of the design is shorter, allowing a tighter turning radius of the equipment without compromising the performance of the drag mat. Overall, the Banko Manufacturing International device is designed to be a self-contained unit requiring minimal effort to attach, use and store.

BRIEF SUMMARY OF THE INVENTION

The objective of the Banko Manufacturing International operator actuated electro-mechanical lift assembly is to provide an easy, effective method of attaching a variety of lawn care related devices which can be used as the applied equipment is operated.

The operator actuated electro-mechanical drag mat lift assembly is 8 feet, 1 inch in width, 44¼ inches in height when in an upright position, 43 inches in length when in a deployed position, 24 inches in length upright when not deployed, with or without an attachment, and is composed of the following elements:

1. A plug-in hitch constructed of heavy wall metal box tubing welded to drilled metal plating capable of reversal for greater flexibility of use.
2. A mount bar constructed of box tubing which links the plug-in hitch to the modified A-frame assembly.
3. A metal tubular-constructed, welded reinforced modified A-frame style frame extending behind the implement being used.
4. An electrical, hydraulic or mechanical actuator attached to a post on the forward position at a mid-section of a tubular reinforcement bar by means of a bolt-mounted pivoting "split T" bracket for the purpose of raising the device.
5. A tubular or box tubing rear accessory bar welded horizontally on the plane of the implement axle which employs either eye bolt, hook or clip attachment points for mounting a variety of optional devices.

DETAILED DESCRIPTION OF THE INVENTION

Figure 1:
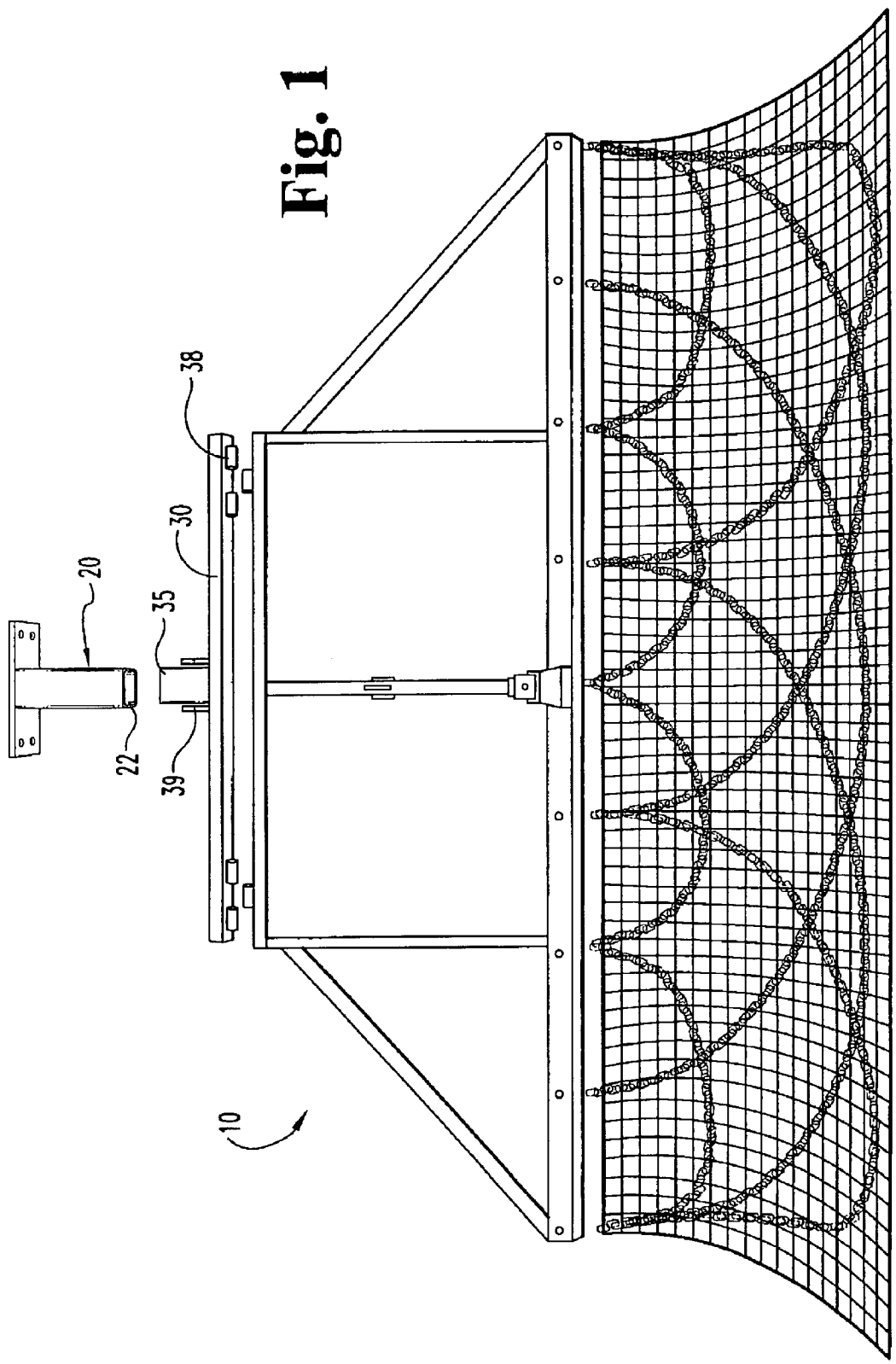
FIG. 1 depicts a top-rear perspective of one embodiment of the present invention. The diagram shows, from the top of the page down, the mount post, insertion and mount bar, modified A-frame and drag mat. Not included in the illustration are the hardware, actuator, electrical switches, linkage or attachment devices which are not unique and may be modified. Compression of the elements in the illustration will demonstrate how each separate component connects to form an integrated unit.
Figure 2:
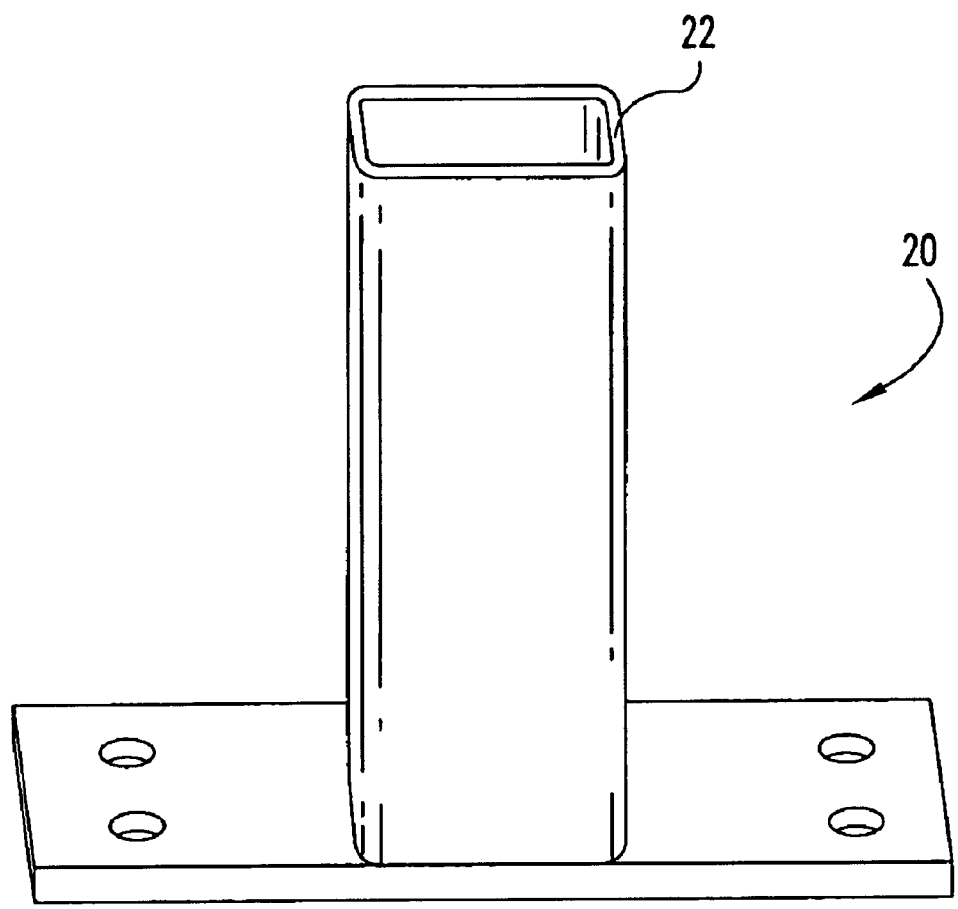
FIG. 2 illustrates the mount post as viewed from a reversed perspective, the drilled mounting plate being the forward part. Not depicted are the bolts used to attach the post to the rear of the equipment being used. The positioning of the drill holes will vary depending upon the manufacture and type of equipment on which the device is to be mounted.
Figure 3:
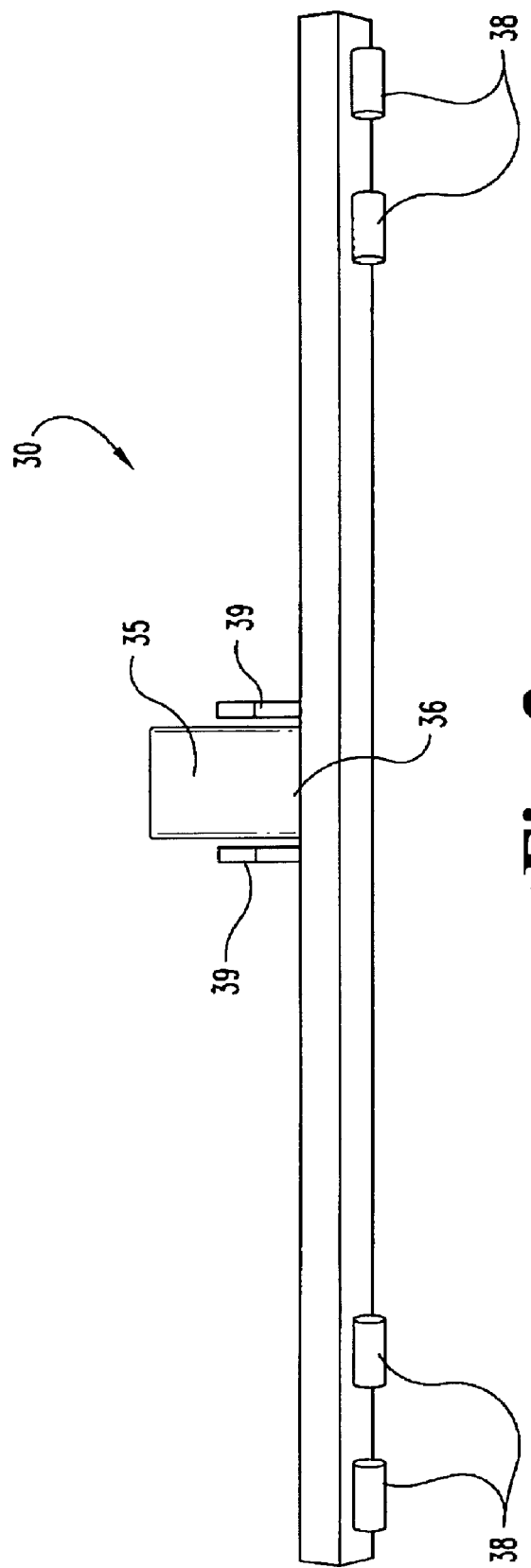
FIG. 3 is a top-rear perspective of a mount bar usable embodiment of the present invention. Not shown are connecting pins.
Figure 4:
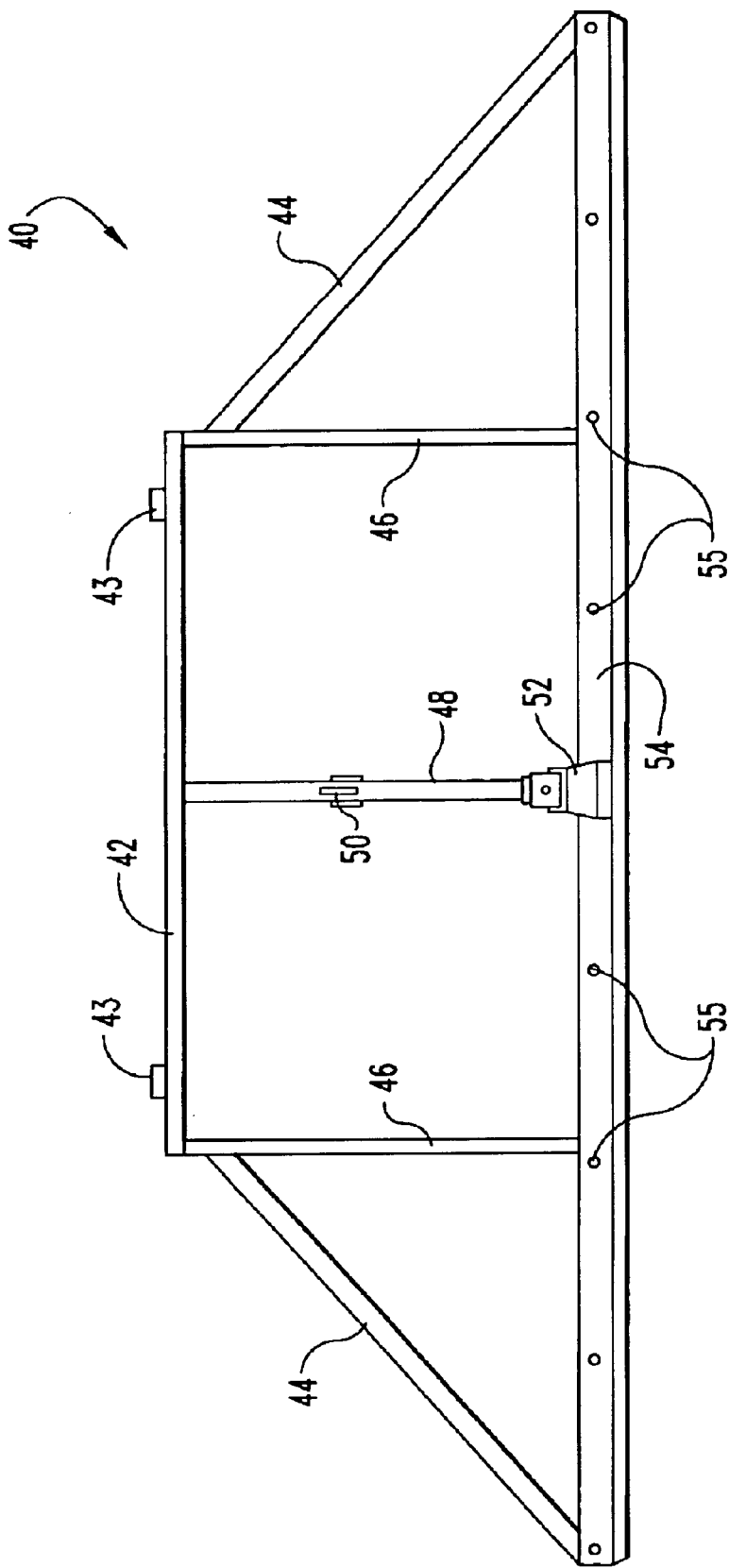
FIG. 4 shows the a modified A-frame as seen from the top-rear. Not depicted is the hardware used to attach the drag mat or other accessories, which will vary.

The purpose of the Banko Manufacturing International operator actuated electro-mechanical drag mat lift assembly is to provide a semi-automatic platform on which to install a variety of accessories. The anticipated application of the system is in the lawn care sector where it is desirable to be able to attach accessories to lawn care equipment in a quick and easy manner. The primary use of the lift will be an assembly on which to mount drag mats, sweeps, rakes or lawn brushes.

The illustrated embodiment of the implement lift 10 is preferably composed of three main sections which, when connected, comprise the assembly. These sections are the mount post 20, insertion and mount bars 35 and 30 respectively, and a modified A-frame 40. A separate section, the drag net 60, is one accessory option attached to the unit for a specific purpose. (see FIGS. 1–6)

Mount Post

Installation of the system is such that the user will bolt a receiver mounting bracket or post 20 to the rear of the equipment 5 to be used so that subsequent connections and disconnections may be facilitated. (see FIG. 6) By way of example, the receiver post 20 (FIG. 2) may be constructed of 3"×3"×3/16" box tubing, 8 inches in length, is drilled through horizontally, MIG welded to 3/8"×3" cold rolled flat bar, having 4 each drilled-through holes not shown.

Insertion and Mount Bar

The lift insertion bar 35 (FIG. 3), an element of the mount bar 30, is preferably constructed of 2½"×2½"×1/4" box tubing, square cut 12 inches in length, is capped on one end 36 and is drilled through horizontally. The bar 35 slides into the receiver bracket 22 of mount post 20 and is locked into position using a 3" hinge pin and clip passing through the drilled, aligned positioning holes.

The mount bar 30, for example 48 inches in length, is preferably constructed of 1½"×1½" box gauge 11 tubing, and is connected, for example by MIG welding, transversely to the capped end 36 of the insertion bar 35 at it's mid point. Two hinge assemblies 38, for example constructed of schedule 80¾" carbon steel pipe, cut 1¼ inches in length, are connected, for example by MIG welding, to the ends of the mount bar facing the rear. A drilled through actuator mounting bracket 39 is connected, foe example by MIG welding, to the top of the mount bar at it's mid-point using 3/8" cold rolled flat bar. (see FIG. 3)

Modified A-frame

The modified A-frame portion 40 of the assembly (FIG. 4) is comprised of a forward transverse hinge bar 42, two angled side-support arms 44, two reinforcement bars 46, a center mounted reinforcement bar 48, a forward pivoting actuator mounting bracket 50, a stationary rear actuator mount bracket 52, and a rear accessory mount bar 54. In one embodiment, the outer frame elements are constructed of 1"×1"×1/4" tubing and are MIG welded to form a modified trapezoidal framework onto which the actuator and accessory will be attached.

The front hinge bar 42, for example 48 inches in length, has two hinges 43, constructed of schedule 80¾" carbon steel pipe cut 2 inches in length, and is connected, for example by MIG welding, facing forward, to the ends at a distance corresponding to the matching hinge elements 38 on the mount bar 30. A hinge pin (not shown), passes through each of the welded hinge pipes, ties the assembled modified A-frame components to the mount bar allowing a range of movement in the frame.

Three reinforcement bars 46 and 48, 26 inches in length, for example by MIG welding, at right angles to the hinge bar 42, provide support to the modified A-frame assembly 40 as well as providing an anchor point for the electro-mechanical actuator and mount bracket 50. The center of the reinforcement bars, positioned parallel 23½ inches from the outer reinforcement bars, is drilled-through to allow an actuator mounting mechanism 50 a degree of perpendicular movement. (see FIGS. 4–5)

The rear accessory bar 54, for example 8 feet, 1 inch in length, is connected, for example by MIG welding, at each end to three reinforcement bars 46 and 48 at a 90 degree angle, and to two additional reinforcement bars 44 at 2¼ inches from the front end of the outer reinforcement bars at a 45 degree angle as measured at the rear attachment point, and at a 45 degree angle as measured from the front attachment point. In one embodiment, nine holes 55 are drilled-through horizontally, equidistant at 12 inch centers, to provide a point of accessory attachment.

The electro-mechanical actuator 70, for example a 12 volt stroke actuator, is preferably attached by bolting each end of the unit to mount brackets using ½" cap screws. The forward end 72 is placed into the front mounting bracket 39 on the mount bar allowing the actuator and frame to swivel downward as the actuator piston is extended, lowering the rear portion of the modified A-frame assembly. (FIG. 6) The hind end 74 of the actuator 70 is bolted to a receiving mechanism or bracket 50 located on the center reinforcement bar. Preferably the actuator is wired to a double-pole, double-throw "momentary on" toggle-type switch, or an equivalent reversal switch, and is connected to a customer supplied power source via a quick connector.

The height adjustment mechanism, constructed using 3/8" cold rolled flat bar, compensates for the variable stroke of the actuator piston. Three drill-through holes positioned, from the top respectively 3/4", 8¼" and 9½" on center, provide adjustment in the mounting of the actuator for varying height requirements. The height adjustment bar is of a welded split "T" design comprised of two parallel, drilled flat bar upright elements, connected by a welded 1"×1" drilled-through block placed at the top of the mechanism, which pivots in forwards and backwards by means of a securing bolt, located at the mid drill through hole, passing through the reinforcement bar 13 inches from the rear accessory bar.

Drag Mat

Figure 5:
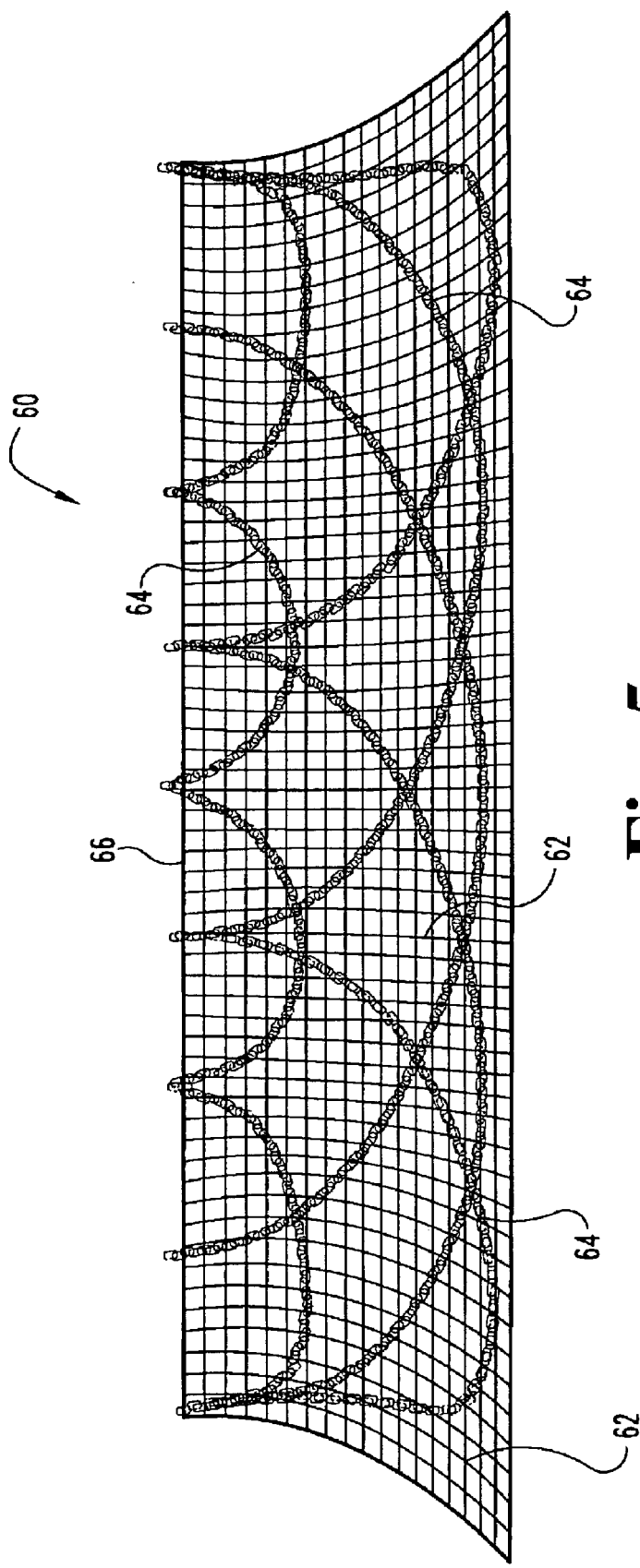
FIG. 5 depicts the combined drag mat netting and chain linkage. The view is from the top-rear. Not illustrated is the method of attaching the mat to the frame, which will vary.
Figure 6:
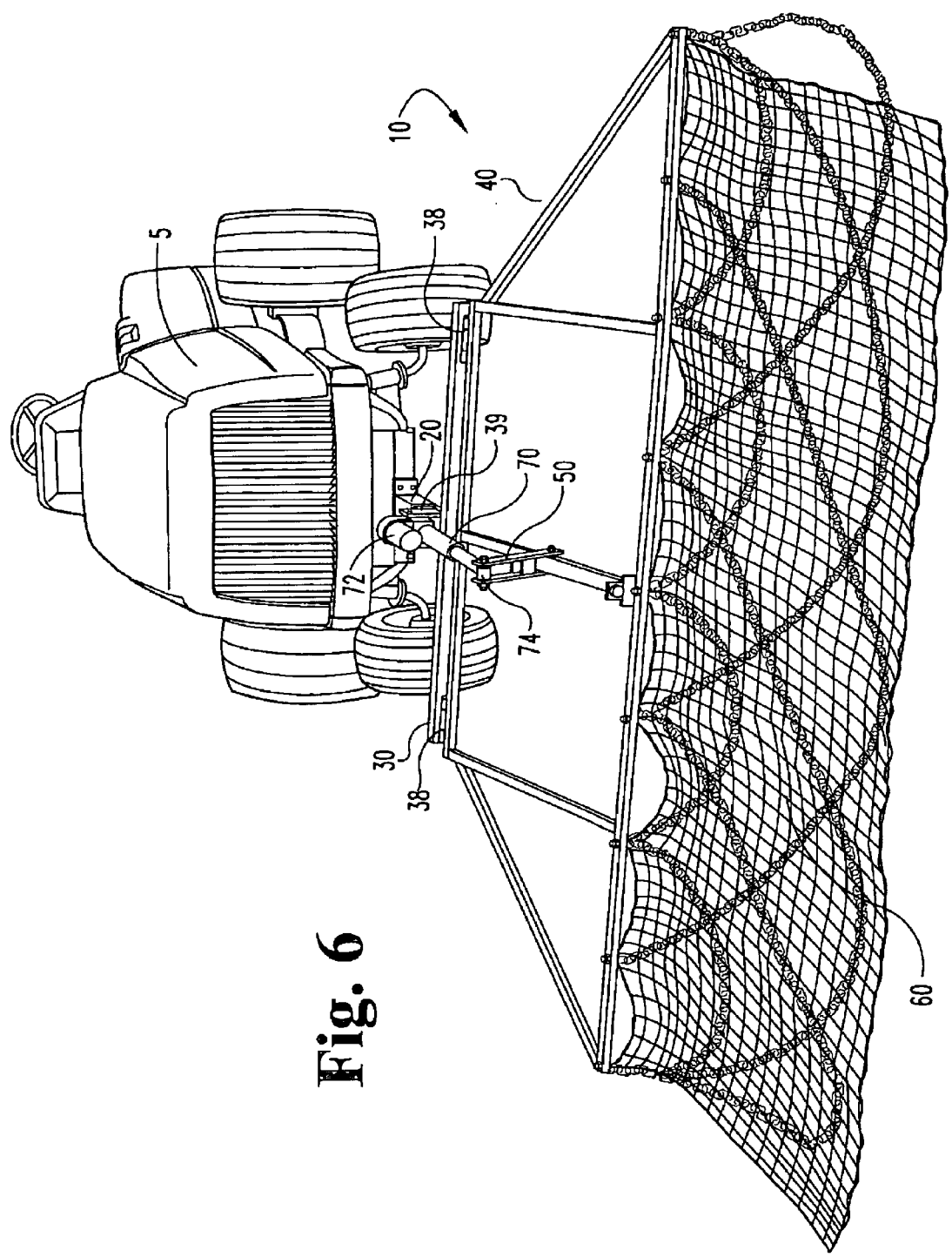
FIG. 6 is a perspective view of a preferred embodiment of the invention.

The drag mat 60, the purpose of which is to groom turf or sod, for example, measures 8 feet in length and 3 feet in length. This component is comprised of a netting material 62, a drag chain system 64, and an attachment cable. In one embodiment, the netting is constructed of 2½ inch 3/8" braided nylon twine cut 3'×8' having selvaged edges, or an equivalent material. The drag chain is 3/16" grade 30 ISO proof coil chain arranged in a three-tier fashion by repair links. The length of each cut chain piece varies from 40" to 45" so that, when draped, the overall chain system 64 has a symmetrical appearance. In all, preferably 11 linked chains comprise the chain drag system 64 and are attached, for example, using chain repair links eye bolts, on the accessory bar 54. A net attachment cable 66, for example, cut 8 feet, 5 inches in length, 3/16 vinyl coated stainless cable or an equivalent, is passed through the netting material 62 at alternating openings at it forward edge. The cable ends are looped through an attachment device, typically an eyebolt fastened to the mount bar 54, and is crimped using cable ferrels or their equivalent. (FIG. 5)

What is claimed is:

1. A lawn drag mat mounting and lifting assembly, comprising:
   a) a mount post attachable to a piece of lawn care equipment;
   b) a mount bar configured to couple with said mount post;

c) a frame portion hingedly mounted to said mount bar; and, d) a lawn drag mat attached to said frame portion;

e) wherein said frame portion is comprised of a modified A-frame, including a forward transverse bar, a rear mount bar and at least one reinforcement bar extending between said forward transverse and said rear mount bar;

f) wherein said drag mat is attached to said rear mount bar; and, g) wherein said drag mat is attached to said rear mount bar via an attachment cable passing through said drag mat and connected to at least one attachment device on said mount bar.

2. The assembly of claim 1 wherein said drag mat includes a netting material and a drag chain system.

3. The assembly of claim 2 wherein said netting material is braided nylon twine.

4. The assembly of claim 3 wherein said drag chain system includes at least one coil chain.

5. The assembly of claim 3 wherein said drag chain system includes at least three tiers of chain.

6. The assembly of claim 1 further comprising an actuator piston coupled between said mount post and said frame portion to cause said frame portion to swivel relative to said mount post when said actuator piston is extended or retracted.

7. The assembly of claim 6, wherein said mount bar has a lift insertion bar, wherein said lift insertion bar is configured to couple with said mount post.

8. The assembly of claim 6 wherein said actuator is extendable and retractable to swivel said frame portion relative to said mount bar.

9. The assembly of claim 8 wherein said actuator is powered.

10. The assembly of claim 6 wherein said actuator is an electro-mechanical stroke actuator.

11. A lawn drag mat mounting and lifting assembly, comprising:

a) a mount post attachable to a piece of lawn care equipment;

b) a mount bar configured to couple with said mount post;

c) a frame portion hingedly mounted to said mount bar;

d) a lawn drag mat attached to said frame portion; and, e) wherein said mount bar includes a lift insertion bar, wherein said mount post includes a receiver bracket, and wherein said mount bar is coupled to said mount post by sliding said lift insertion bar into said receiver bracket.

12. A lawn drag mar mounting and lifting assembly, comprising:

a) a mount post attachable to a piece of lawn care equipment;

b) a mount bar configured to couple with said mount post;

c) a frame portion hingedly mounted to said mount bar;

d) a lawn drag mat attached to said frame portion; and e) an actuator piston coupled between said mount post and said frame portion to cause said frame portion to swivel relative to said mount post when said actuator piston is extended or retracted;

f) wherein said actuator is extendable and retractable to swivel said frame portion relative to said mount bar; and, g) a height adjustment mechanism interacting with said frame to limit the swivel height of said frame.

13. A lawn drag mat mounting and lifting assembly, comprising:

a) a mount post attachable to a piece of lawn care equipment;

b) a mount bar configured to couple with said mount post;

c) a frame hingedly mounted to said mount bar;

d) a lawn drag mat attached to said frame portion;

e) an actuator piston coupled between said mount post and said frame to cause said frame to swivel relative to said mount post when said actuator piston is extended or retracted;

f) wherein said mount bar has a lift insertion bar, wherein said lift insertion bar is configured to couple with said mount post; and, g) wherein said mount bar includes a front mounting bracket, wherein said frame includes a receiving mechanism and wherein said actuator includes a forward end mounted to said front mounting bracket and a hind end mounted to said receiving mechanism.

14. The assembly of claim 13 wherein said drag mat includes a netting material and drag chain system.

* * * * *

UNITED STATES PATENT AND TRADEMARK OFFICE
CERTIFICATE OF CORRECTION

PATENT NO. : 6,843,325 B2
DATED : January 18, 2005
INVENTOR(S) : Richard J. Banko It is certified that error appears in the above-identified patent and that said Letters Patent is hereby corrected as shown below:

Column 6,
Line 6, replace "mar" with -- mat --.

Signed and Sealed this

Fifth Day of April, 2005

JON W. DUDAS
*Director of the United States Patent and Trademark Office*